US010070311B2

(12) United States Patent
Lee et al.

(10) Patent No.: US 10,070,311 B2
(45) Date of Patent: Sep. 4, 2018

(54) METHOD AND APPARATUS FOR TRANSMITTING VEHICLE ACCIDENT INFORMATION BASED ON INTERACTION BETWEEN DEVICES AND METHOD AND VEHICLE ACCIDENT INFORMATION COLLECTION APPARATUS

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Yunmin Kim, Suwon-si (KR); Dongho Won, Seoul (KR); Mingyu Lee, Seongnam-si (KR); Jaewook Jung, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 156 days.

(21) Appl. No.: 15/083,769

(22) Filed: Mar. 29, 2016

(65) Prior Publication Data

US 2016/0323741 A1    Nov. 3, 2016

(30) Foreign Application Priority Data

Apr. 30, 2015    (KR) .................. 10-2015-0061281

(51) Int. Cl.
*H04L 9/32*     (2006.01)
*H04W 12/06*    (2009.01)
(Continued)

(52) U.S. Cl.
CPC .......... *H04W 12/06* (2013.01); *G06F 21/602* (2013.01); *H04L 9/3263* (2013.01);
(Continued)

(58) Field of Classification Search
None
See application file for complete search history.

(56) References Cited

U.S. PATENT DOCUMENTS

2006/0092043 A1*  5/2006  Lagassey .............. G07C 5/008
                                              340/907
2006/0095199 A1*  5/2006  Lagassey .............. G07C 5/008
                                              701/117
(Continued)

FOREIGN PATENT DOCUMENTS

JP    2010-72788 A      4/2010
JP    2012-128734 A     7/2012
(Continued)

OTHER PUBLICATIONS

Korean Office Action dated Aug. 16, 2016 in counterpart Korean Patent Application No. 10-2015-0061281 (7 pages, in English).

*Primary Examiner* — Brandon S Hoffman
(74) *Attorney, Agent, or Firm* — NSIP Law (57) ABSTRACT

Disclosed herein is a method for collecting, by a vehicle information collection apparatus, vehicle accident information. The method includes receiving vehicle accident information including impact detection time information and location information from a plurality of vehicle communication terminals, determining whether a vehicle accident has occurred based on the received vehicle accident information, requesting a vehicle communication terminal which belongs to the plurality of vehicle communication terminals and which is related to the vehicle accident to send accident information based on a result of the determination, receiving encrypted image data related to the vehicle accident from the vehicle communication terminal related to the vehicle accident in response to the request, and decoding the received
(Continued)

image data and storing the decoded image data along with the vehicle accident information.

20 Claims, 8 Drawing Sheets

(51) Int. Cl.
| | |
|---|---|
| H04W 12/10 | (2009.01) |
| G06F 21/60 | (2013.01) |
| H04L 29/06 | (2006.01) |
| H04W 4/02 | (2018.01) |
| H04W 12/02 | (2009.01) |
| H04L 29/08 | (2006.01) |
| H04W 4/90 | (2018.01) |

(52) U.S. Cl.
CPC ........ *H04L 63/0428* (2013.01); *H04L 63/123* (2013.01); *H04L 67/12* (2013.01); *H04W 4/02* (2013.01); *H04W 4/90* (2018.02); *H04W 12/02* (2013.01); *H04W 12/10* (2013.01); *H04L 2209/84* (2013.01)

(56) References Cited

U.S. PATENT DOCUMENTS

| | | | | |
|---|---|---|---|---|
| 2009/0157255 A1* | 6/2009 | Plante | ............... | G06Q 10/00 701/33.4 |
| 2011/0254676 A1* | 10/2011 | Marumoto | ............. | G07C 5/008 340/441 |
| 2013/0267194 A1* | 10/2013 | Breed | ............... | H04W 4/90 455/404.2 |
| 2013/0282267 A1* | 10/2013 | Rubin | ............... | G08G 9/02 701/301 |
| 2014/0132404 A1* | 5/2014 | Katoh | ............... | B60R 21/013 340/436 |

FOREIGN PATENT DOCUMENTS

| | | |
|---|---|---|
| KR | 10-1210723 B1 | 12/2012 |
| KR | 10-2013-0108928 A | 10/2013 |
| WO | WO 2012/090438 A1 | 7/2012 |

\* cited by examiner

METHOD AND APPARATUS FOR TRANSMITTING VEHICLE ACCIDENT INFORMATION BASED ON INTERACTION BETWEEN DEVICES AND METHOD AND VEHICLE ACCIDENT INFORMATION COLLECTION APPARATUS

Priority to Korean patent application number 2015-0061281 filed on Apr. 30, 2015, the entire disclosure of which is incorporated by reference herein, is claimed.

BACKGROUND OF THE INVENTION

Field of the Invention

The present invention relates to a method and system for collecting traffic accident information through communication between devices and, more particularly, to a method and system for collecting traffic accident information based on communication between a traffic accident vehicle and Intelligent Transport System (ITS) infrastructure.

Discussion of the Related Art

A limit to the collection of traffic accident information through a black box

When a traffic accident is generated, a person may collect information about a traffic accident through a black box which was purchased in order to collect traffic accident evidence and which chiefly includes an image recording device as a main element, but it is difficult to identify accident vehicle information through an image in the case of rain or at night. Although an investigation agency tries to collect black box information related to a traffic accident for lawful purposes, it is difficult to check whether the owner of the black box has information about the traffic accident unless the owner intentionally makes public or distribute the black box information. Furthermore, although a vehicle that is estimated to have the black box information is specified, the time, a cost, and personnel are consumed to check whether the specified vehicle is related to the traffic accident.

In the future, most of vehicle electronic systems will be equipped with a communication device in order to provide an infotainment service. A black box having purposes, such as the collection of driver/vehicle state information, a request for an urgent rescue, or the analysis of a traffic flow, will be mounted on the vehicle electronic system separately from a black box having an image recording device as a main element. An Intelligent Transport System (ITS) is advanced in order to provide various services based on an interaction with a vehicle electronic system. Today, the ITS is limitedly used to record information about vehicles which access a specific area, but the utilization of the ITS may be increased by continuing to introduce a technology for collecting and managing information through only an interaction between devices. The ITS will play an important role even in terms of traffic management in a process of expanding current infrastructure. Accordingly, there is a need for a method for checking the occurrence of a traffic accident through the ITS and for collecting traffic accident information through only an interaction between a vehicle and the ITS without the intervention of a person in performing a series of processes, such as the collection of accident information and emergency rescue measures.

A Communication Congestion Problem Attributable to the Access of a Plurality of Vehicles It is expected that access to a mobile communication system will explode because it is expected that various things, such as traffic lights, traffic control systems, and streetlamps, in addition to vehicle electronic systems will be included in communication devices. It is expected that a communication congestion problem will increase due to a limit to an existing mobile communication system constructed for only communication between people and a reduction of performance, such as a reduction of throughput and an increase of a delay time, will be increased. For example, in 3GPP, that is, a representative mobile communication system standard organization, standardization regarding an access control method is in progress in order to reduce such a congestion problem.

In particular, in the prior art, there is a problem in that means for the rapid collection and propagation of accident information is not provided because an access request by an accident vehicle is not handled on a pair with an access request by another vehicle or thing. The time required to propagate the occurrence of an accident in order to prevent an additional accident is very short due to high moving speed of a vehicle. For example, in IEEE 802.11p, that is, a standard related to vehicle communication, the occurrence of an accident has been made to be rapidly propagated by exchanging pieces of information between vehicles within 100 ms. Accordingly, there is a need for an access control method in a mobile communication system for effectively accommodating an access request by an accident vehicle even in an environment in which a communication congestion increases.

The Non-Execution of an Authentication Procedure for a Terminal (or Black Box) Device In an existing method (Korean Patent No. 10-1210723), an authentication procedure for a black box device has been omitted. In this case, if an attacker intercepts an image packet transmitted by a black box and sends it to a server, the server is not confident whether the received packet has been transmitted by the attacker or it has been transmitted by a legitimate black box device. In order to prevent such a problem, an authentication procedure for a black box device must be previously performed.

The Generation of a Privacy Invasion Problem for the Contents of an Image

A 2-channel black box for recording both images and voice inside and outside a vehicle is mounted on the black box of the vehicle. In this case, a captured image of the black box may include private conversations and personal habits that are formed unconsciously. Image information stored along with the start of vehicle driving includes all of pieces of additional information related to information about the driving of a driver. If an image of the black box including such contents is leaked to the Internet, a severe privacy invasion problem may be caused. Such a leak may become a tool which may be used by making bad use of pieces of personal information related to the moving path of the driver. Accordingly, there is a need for a method for improving a public concern of an image of the black box and also minimizing the invasion of privacy.

Deficiency of Safety and Efficiency

If a replay attack in which an attacker intercepts authentication code transmitted from a black box to a server and sends the authentication code to the server is performed for integrity verification, the server is unaware of whether the corresponding packet has been received from the attacker. That is, there is a need for a countermeasure capable of preventing such a replay attack.

Furthermore, an existing integrity verification method adopts a method for generating authentication code by compressing image data into a compressed value. A method for compressing the entire image data into a compressed value and using the compressed value as authentication code in generating an authentication code value is problematic in that it is very inefficient in terms of a computational load.

SUMMARY OF THE INVENTION

An object of the present invention is to provide a method for specifying a traffic accident vehicle based on communication between the traffic accident vehicle and ITS infrastructure and collecting information related to the traffic accident.

Another object of the present invention is to provide a method for reducing a congestion generated due to access by a plurality of vehicles, a method for protecting privacy in a process of collecting information about an accident vehicle through ITS, and a method for the simultaneous guarantee of integrity.

In an aspect, a method for collecting, by a vehicle accident information collection apparatus, vehicle accident information may include receiving vehicle accident information including impact detection time information and location information from a plurality of vehicle communication terminals, determining whether a vehicle accident has occurred based on the received vehicle accident information, requesting a vehicle communication terminal which belongs to the plurality of vehicle communication terminals and which is related to the vehicle accident to send accident information based on a result of the determination, receiving encrypted image data related to the vehicle accident from the vehicle communication terminal related to the vehicle accident in response to the request, and decoding the received image data and storing the decoded image data along with the vehicle accident information.

Determining whether the vehicle accident has occurred based on the received vehicle accident information may include determining whether the vehicle accident information including the impact detection time information and the location information included within a predetermined threshold time and distance range is plural and determining that the vehicle accident has occurred if, as a result of the determination, it is determined that the vehicle accident information is plural.

The method for collecting vehicle accident information may further include specifying a terminal which has sent information as the vehicle communication terminal related to the vehicle accident based on information about the time when the vehicle accident information has been received and the place where the vehicle accident information has been received if, as a result of the determination, it is determined that the vehicle accident has occurred, sending a device authentication request to the specified vehicle communication terminal related to the vehicle accident, receiving authentication information transmitted by the vehicle communication terminal related to the vehicle accident in response to the device authentication request, and decoding the received authentication information and authenticating the vehicle communication terminal related to the vehicle accident.

A public key value may be previously shared with the vehicle communication terminal related to the vehicle accident for device authentication. When a server access request and a device-unique number are received from the vehicle communication terminal related to the vehicle accident, a random number may be generated and transmitted to the vehicle communication terminal related to the vehicle accident.

When information obtained by encrypting a device-unique number, the random number, and a server IP value transmitted by the vehicle communication terminal related to the vehicle accident, using a personal key value is received, the received information may be decoded using the public key value, pieces of corresponding information may be verified, and the vehicle communication terminal related to the vehicle accident may be notified of the permission of the transmission of image data.

The method for collecting vehicle accident information may further include searching for a surrounding terminal within a specific distance from the vehicle communication terminal related to the vehicle accident at the vehicle accident location and time if, as a result of the determination, it is determined that the vehicle accident has occurred, and requesting image data related to the vehicle accident from the surrounding terminal if, as a result of the search, the retrieved surrounding terminal is found to be present.

The method for collecting vehicle accident information may further include receiving integrity verification information along with the encrypted image data received in response to the request and decoding the encrypted image data using the integrity verification information.

The integrity verification information may include a Message Authentication Code (MAC) tag value generated through hash operation based on a header representative of the image data and the time stamp value of a point of time at which the image data may be transmitted.

The time lag between the time stamp value attached to the MAC tag value and the time stamp value of a point of time at which the image data is received may be calculated. The integrity of the image data may be verified by determining whether the time lag is within a permissible range.

In another aspect, a vehicle accident information collection apparatus may include a vehicle accident information reception unit configured to receive vehicle accident information including impact detection time information and location information from a plurality of vehicle communication terminals, an accident determination unit configured to determine whether a vehicle accident has occurred based on the received vehicle accident information, an information request unit configured to request a vehicle communication terminal which belongs to the plurality of vehicle communication terminals and which may be related to the vehicle accident to send accident information based on a result of the determination, a decoding unit configured to decode encrypted image data related to the vehicle accident, which may be received in response to the request, and a storage unit configured to store the decoded image data along with the vehicle accident information.

In yet another aspect, a method for sending, by a vehicle communication terminal, vehicle accident information to a vehicle information collection apparatus may include receiving an impact detection signal of a specific strength or more from a sensor within a vehicle, generating vehicle accident information based on impact detection time information and location information included in the received impact detection signal, sending the generated vehicle accident information to the vehicle information collection apparatus, receiving an accident information transmission request based on a result of a determination of whether a vehicle accident has occurred by the vehicle information collection apparatus, encrypting image data related to the vehicle accident in response to the request, and sending the encrypted image data to the vehicle information collection apparatus.

The method for sending vehicle accident information may further include receiving access barring information from a base station before sending the generated vehicle accident information to the vehicle information collection apparatus, selecting a specific random number based on the access barring information, and sending the selected random number to the base station. The base station may compare the selected random number with a probability value of the access barring information and permit random access if, as a result of the comparison, the selected random number is found to be lower than the probability value.

The specific random number may be selected in one of periods divided based on the amount of impact.

The periods divided based on the amount of impact may have different access priorities.

The method for sending vehicle accident information may further include receiving a device authentication request from the vehicle information collection apparatus if the vehicle accident is determined to have occurred on a result of the determination of the vehicle information collection apparatus.

The method for sending vehicle accident information may further include sending a server access request and a device-unique number in response to the device authentication request, encrypting the device-unique number, a random number, and a server IP value using a personal key when the random number may be received from the vehicle information collection apparatus, and sending the encrypted device-unique number, random number, and server IP value to the vehicle information collection apparatus.

The method for sending vehicle accident information may further include encrypting the image data related to the vehicle accident using a masking scheme in response to the accident information transmission request and sending the encrypted image data to the vehicle information collection apparatus.

The method for sending vehicle accident information may further include sending integrity verification information along with the encrypted image data. The integrity verification information may include a Message Authentication Code (MAC) tag value generated through hash operation based on a header representative of the image data and the time stamp value of a point of time at which the image data may be transmitted.

In further yet another aspect, an apparatus for transmitting vehicle accident information to a vehicle information collection server may include an intra-vehicle signal reception unit configured to receive an impact detection signal of a specific strength or more from a sensor within a vehicle, a vehicle accident information generation unit configured to generate vehicle accident information based on impact detection time information and location information included in the received impact detection signal, a request reception unit configured to receive an accident information transmission request based on a result of a determination of whether a vehicle accident has occurred by the vehicle information collection apparatus, an encryption unit configured to encrypt image data related to the vehicle accident in response to the request, and an information transmission unit configured to send the generated vehicle accident information and the encrypted image data to the vehicle information collection apparatus.

DETAILED DESCRIPTION OF THE EMBODIMENTS

The present invention may be modified in various ways and may be implemented to have several embodiments. Specific embodiments are illustrated in the drawings and are described in detail.

It is however to be understood that the present invention is not intended to be limited to the specific embodiments and the present invention includes all modifications, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

Unless defined otherwise, all terms used herein, including technical terms or scientific terms, have the same meanings as those generally understood by persons of ordinary skill in the technical field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise.

Hereinafter, some embodiments of the present invention are described in more detail with reference to the accompanying drawings. In describing the present invention, in order to help general understanding, the same reference numerals are used to denote the same elements throughout the drawings, and a redundant description of the same elements is omitted.

Hearinafter, the term "black box" can be considered as a dashboard camera.

A System for Collecting Vehicle Accident Information

Figure 1:
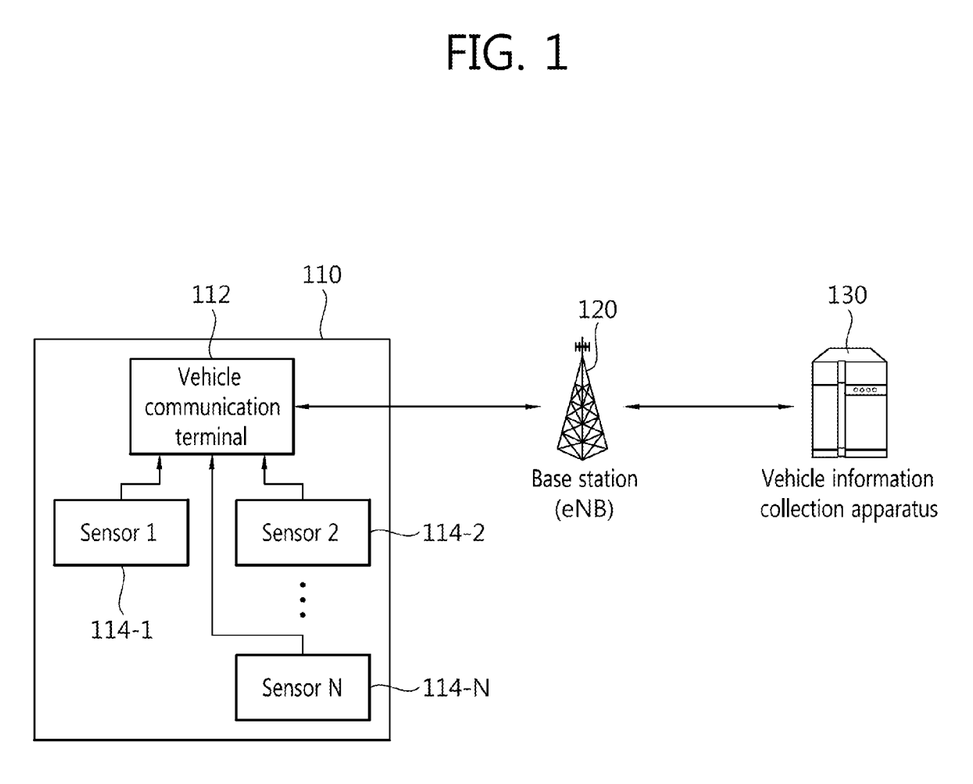
FIG. 1 is a block diagram showing a system to which a method for collecting vehicle accident information according to an embodiment of the present invention is applied.

FIG. 1 is a block diagram showing a system to which a method for collecting vehicle accident information according to an embodiment of the present invention is applied. As shown in FIG. 1, the system for collecting vehicle accident information according to an embodiment of the present invention may include a vehicle communication terminal 112, a base station 120, and a vehicle information collection apparatus 130.

Referring to FIG. 1, the vehicle communication terminal 112 is an apparatus having a communication function present in a vehicle 110 and may be a black box or a vehicle electronic system. The vehicle communication terminal 112 may also be called a vehicle information transmission apparatus or a black box in this specification.

The vehicle communication terminal 112 may have a Vehicle-to-Vehicle (V2V) communication function, a short distance communication function, and a 3G/4G (including LTE) communication function in addition to an in-vehicle communication function. Furthermore, the vehicle communication terminal 112 may have a function for recording and storing image data. Furthermore, the vehicle communication terminal 112 may have a function for receiving GPS information in order to clarify the time when image data is recorded and the location where the image data is recorded.

The vehicle communication terminal 112 may receive information related to a vehicle accident from various sensors 114-1~114-N within the vehicle using in-vehicle communication. In accordance with an embodiment of the present invention, the sensors 114-1~114-N may include impact detection sensors (e.g., an electronic vibration detection sensor and an acceleration sensor) for detecting a vehicle accident. Each of the sensors 114-1~114-N include a camera (e.g., a side or rear camera), may receive image data information, and may send it to the vehicle information collection apparatus 130.

In accordance with another embodiment of the present invention, the vehicle communication terminal 112 itself may have a sensor function and detect and record fine movements on the left, right, front, and rear sides of the vehicle 110. The vehicle communication terminal 112 may send vehicle accident information, received through the sensors 114-1~114-N, to the vehicle information collection apparatus 130 through the base station 120. Furthermore, if the vehicle information collection apparatus 130 determines a vehicle accident, the vehicle communication terminal 112 may encrypt image data that was recorded when the accident occurred and send the encrypted image data to the vehicle information collection apparatus 130 in response to a request from the vehicle information collection apparatus 130.

The base station 120 is connected to a core network and is responsible for connection between the vehicle communication terminal 112 and the vehicle information collection apparatus 130. The base station 120 may be a NodeB in 3G communication and an eNodeB in LTE communication. For example, the base station 120 may send vehicle accident information, received from the vehicle communication terminal 112, to the vehicle information collection apparatus 130. Furthermore, the base station 120 may manage random access by the vehicle communication terminal 112. This is described in detail later with reference to FIGS. 3 and 4.

The vehicle information collection apparatus 130 may be a separate server vehicle accident information collection apparatus. The separate server apparatus may be present in a separate agency (e.g., an investigation agency or an insurance company related to vehicles). The vehicle information collection apparatus 130 may obtain information about the time when a vehicle accident is generated and the position where a corresponding vehicle is placed, which are included in vehicle accident information received from the vehicle communication terminal 112, may specify an accident vehicle, and may collect the vehicle accident information. In a process of collecting the vehicle accident information, an interaction with the vehicle communication terminal 112 is required, and authentication, the protection of privacy, and integrity need to be simultaneously achieved. Such a process is described in detail with reference to FIG. 2.

A Method for Collecting Vehicle Accident Information

Figure 2:
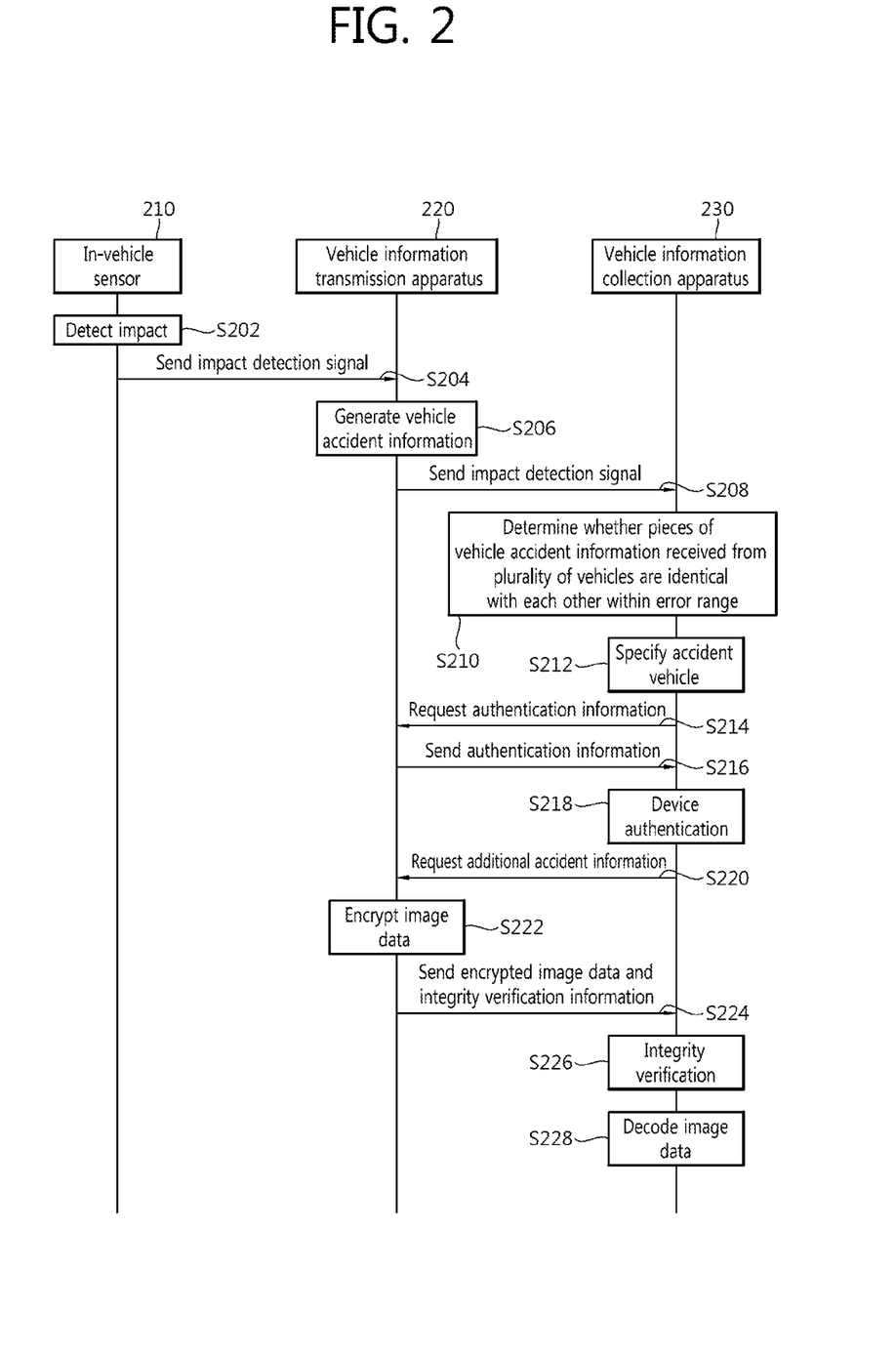
FIG. 2 is a flowchart illustrating a method for collecting vehicle accident information according to an embodiment of the present invention.

FIG. 2 is a flowchart illustrating a method for collecting vehicle accident information according to an embodiment of the present invention.

Referring to FIG. 2, when an accident between vehicles is generated, an impact is delivered to the vehicles. When an in-vehicle sensor 210 detects the impact at step S202, it sends an impact detection signal to the vehicle information transmission apparatus 220 at step S204. When the impact detection signal is received, the vehicle information transmission apparatus 220 generates vehicle accident information including an impact detection time and location information (e.g., including GPS information) at step S206. Furthermore, the vehicle information transmission apparatus 220 may send the vehicle accident information, including the impact detection time and the location information, to a vehicle information collection apparatus 230 at step S208.

If pieces of vehicle accident information (including time and location information) received from a plurality of vehicles are identical with each other within an error range, that is, if a plurality of pieces of vehicle accident information is present within a predetermined threshold time and distance range, the vehicle information collection apparatus 230 may determine the vehicle accident information to be a vehicle accident and detect an accident vehicle at step S210. Furthermore, the vehicle information collection apparatus 230 may specify a vehicle that has transmitted the vehicle accident information based on information about the time when the vehicle accident information was received and the location where the vehicle is placed at step S212. If the vehicle accident information is determined to have been received from a single vehicle, the vehicle information collection apparatus 230 does not determine the vehicle accident information to be a vehicle accident. That is, only when two or more of pieces of vehicle accident information are identical with each other within an error range, the vehicle information collection apparatus 230 may determine the vehicle accident information to be a vehicle accident. In this case, the vehicle information collection apparatus 230 may specify a vehicle included in a specific radius from an accident point as an accident vehicle or a vehicle around the accident and may perform device authentication and an image data request.

When a vehicle is specified, the vehicle information collection apparatus 230 requests the vehicle information transmission apparatus 220 of the corresponding vehicle from authentication information at step S214. The vehicle information transmission apparatus 220 of the accident vehicle sends the requested authentication information at step S216. The vehicle information collection apparatus 230 may decode the received authentication information, may authenticate a device by performing confidentiality verification on the encrypted information at step S218, and may request an authenticated vehicle to send information about the accident vehicle and accident information at step S220. The authentication procedure of the device is described in more detail later.

In response to the accident information request, the vehicle information transmission apparatus 220 may generate a hash value for image data encryption and integrity verification at step S222 and send the encrypted data and integrity verification information to the vehicle information collection apparatus 230 at step S224. The vehicle information collection apparatus 230 may perform integrity verification at step S226, may decode the image data, and may store the decoded image data in a database at step S228.

A Random Access Method of a Terminal

Figure 3:
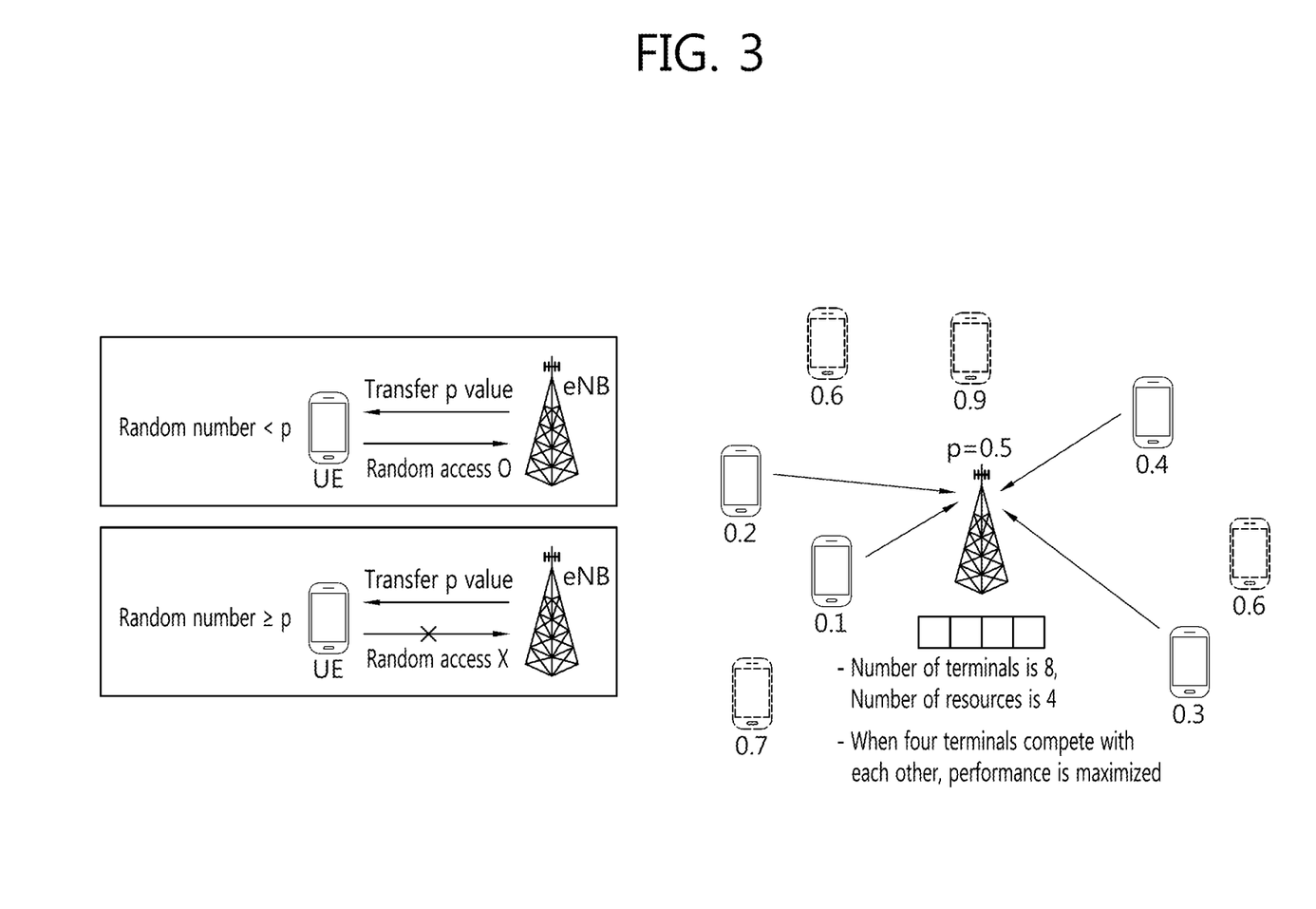
FIG. 3 is a conceptual diagram illustrating a method for performing, by a terminal, random access.

FIG. 3 is a conceptual diagram illustrating a method for performing, by a terminal, random access.

Referring to FIG. 3, the terminal (refers to the vehicle information transmission apparatus) attempts random access to a base station in order to send vehicle accident information. A representative technology includes an access barring method. The access barring method is a method for selecting, by a terminal, a specific value between 0 and 1 when a base station sends a value between 0 and 1 to the terminal, comparing the selected value with a value received from the base station, and allowing the terminal to access the base station only when the specific value selected by the terminal is relatively small. Accordingly, access by a terminal can be probabilistically limited. Since a terminal randomly selects a value between 0 and 1, a transmission opportunity can be distributed between terminals probabilistically equally.

In the embodiment of FIG. 3, the access barring method may be applied to an interaction process between things based on LTE/LTE-A. In LTE/LTE-A, various things may access a base station (e.g., e-NodeB) through a communication function and may continue to perform random access processes for communication. The access barring process is performed prior to the random access process, and the base station may selectively adopt the access barring process in order to control the amount of access by a plurality of terminals probabilistically. In accordance with an embodiment of the present invention, the base station sends a probability "p" to a terminal, and the terminal determines whether or not to access the base station based on the received probability "p." A probability that the terminal may access the base station may be increased according to an increase of the probability "p" transmitted by the base station.

Figure 4:
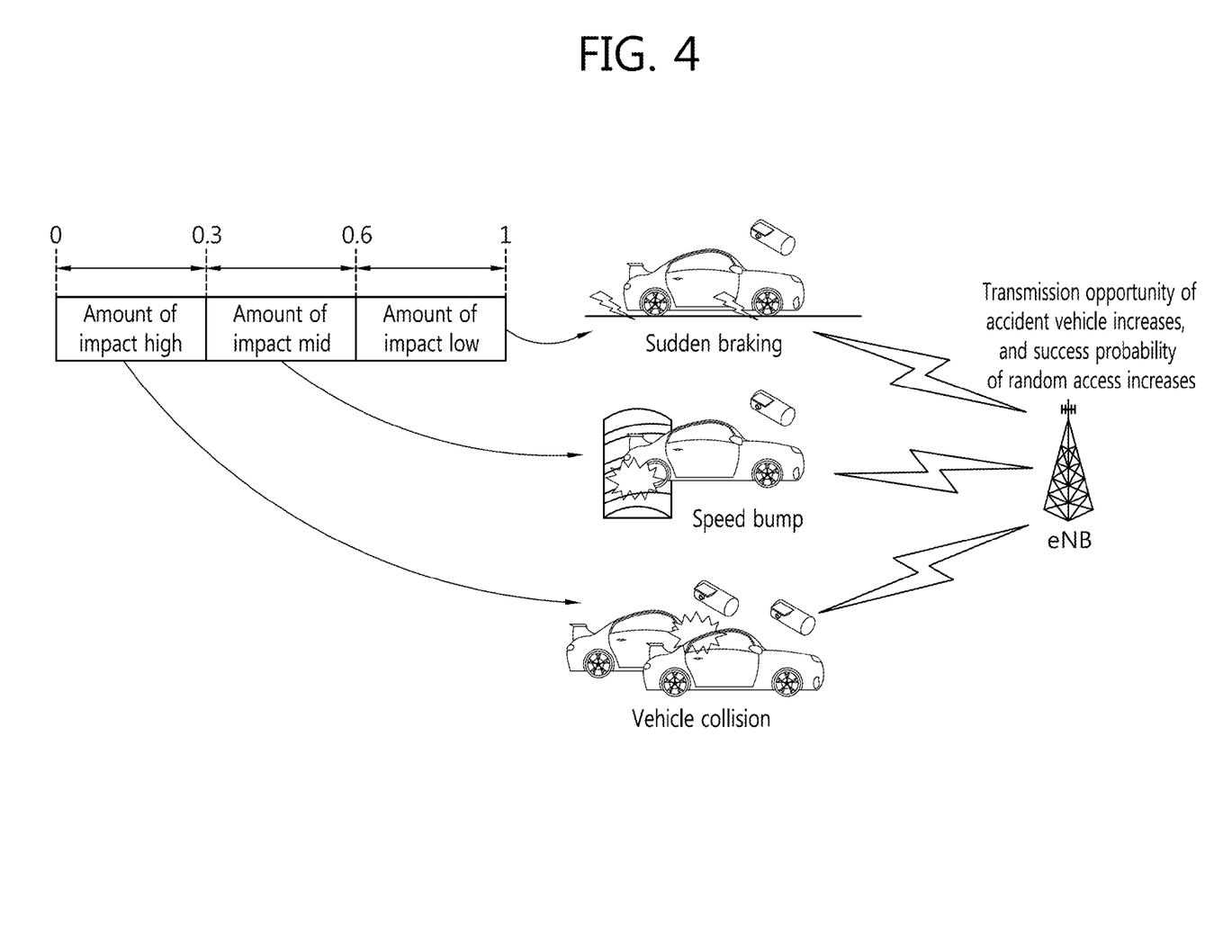
FIG. 4 is a conceptual diagram illustrating a method for performing random access based on the priority depending on random number selection periods divided based on the amount of impact.

FIG. 4 is a conceptual diagram illustrating a method for performing random access based on the priority depending on random number selection periods divided based on the amount of impact.

Referring to FIG. 4, a higher priority may be assigned to a terminal if the amount of impact sensed by the terminal is greater. That is, the terminal may divide a random number selection period depending on the amount of impact. In this case, the random number selection period may be divided so that a possibility that a random number of a higher priority will be selected according to an increase of the amount of impact is increased.

In the embodiment of FIG. 4, the terminal may select random numbers in a period between 0 and 0.3 when the amount of impact is the greatest (e.g., when an actual vehicle accident occurred), in a period between 0 and 0.6 in the next higher priority (e.g., a minor collision between vehicles at slow speed or a speed bump pass situation), and in a section between 0 and 1 when the amount of impact is the smallest (e.g., a sudden braking or sudden unintended acceleration situation). Accordingly, the terminal may have differentiated access priorities and perform a random access process. The terminal may receive system information, including random access and access control information, from a base station. If access barring information is included, the terminal may select a random number based on a priority control scheme according to an embodiment of the present invention and perform a process for comparing the selected random number with an access barring probability value included in the access barring information. If the selected random number is selectively low, the terminal may perform a random access process.

A Method for Determining an Accident Vehicle

Figure 5:
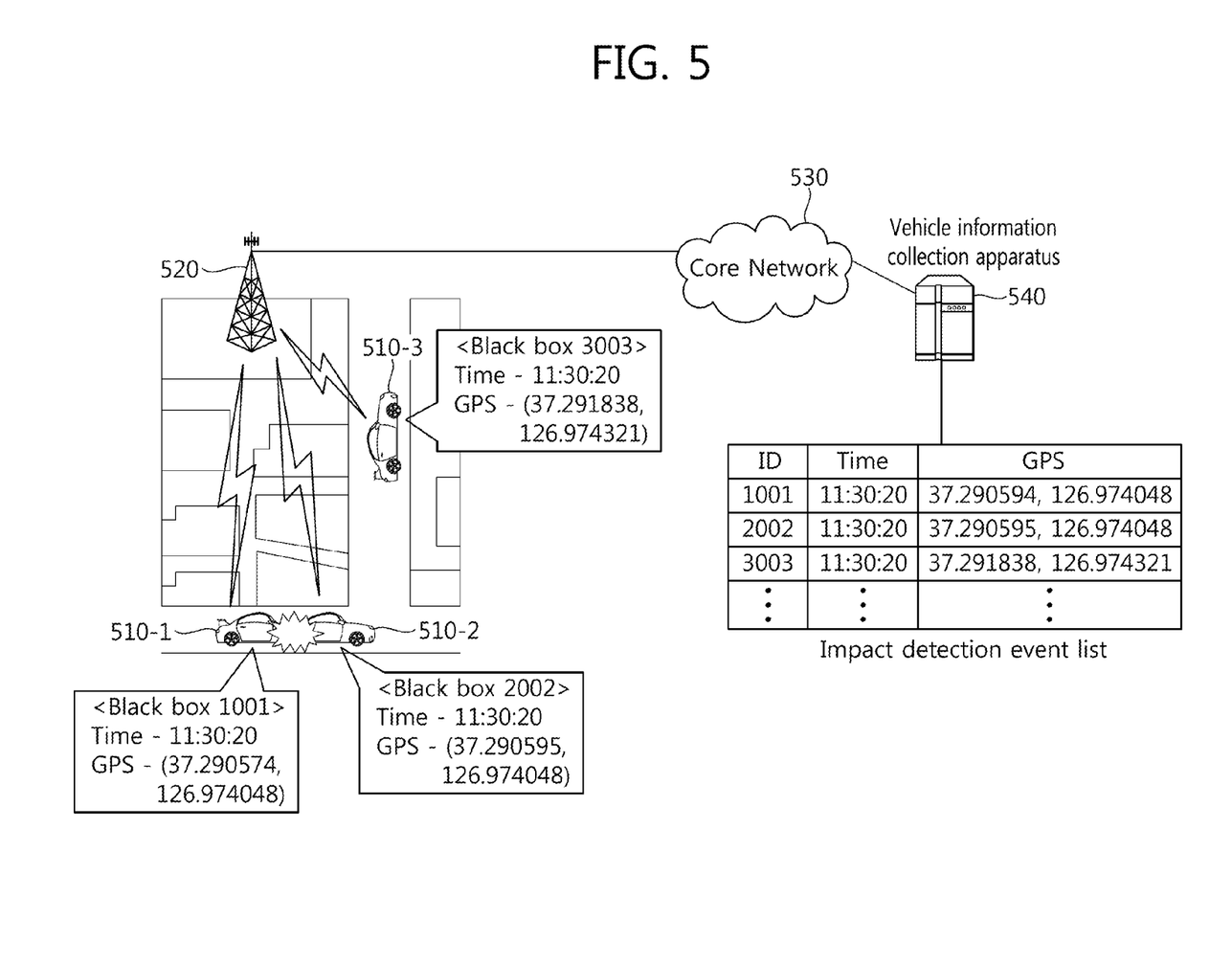
FIG. 5 is a conceptual diagram illustrating a method for determining an accident vehicle in a vehicle information collection apparatus.

FIG. 5 is a conceptual diagram illustrating a method for determining an accident vehicle in a vehicle information collection apparatus.

Referring to FIG. 5, each of a plurality of black boxes 510-1, 510-2, and 510-3 is an apparatus for sending vehicle accident information (including impact detection time and location information) to a base station 520. First, it is assumed that the black box 1001 510-1 and the black box 2002 510-2 have the same impact detection time and location information and the black box 3003 510-3 has the same time information, but has different GPS location information. In this case, vehicle accident information is first transmitted to a vehicle information collection apparatus 540 through the base station 520 over a core network 530. The vehicle information collection apparatus 540 may generate the vehicle accident information in a list form. The vehicle information collection apparatus 540 may classify an impact, related to the two black boxes 510-1 and 510-2, as a traffic accident case using the fact that time and GPS information corresponding to the IDs 1001 and 2002 of pieces of information collected through an impact detection event list are identical within a specific range. In this case, the ID may be randomly generated by the vehicle information collection apparatus 540 in a process of collecting information. Vehicle information may be used as the ID. In the case of the ID 3003, time information is similar, but GPS location information is out of a threshold range. Accordingly, an impact related to the black box 3003 510-3 may be determined to be an impact event generated in the daily life of a single vehicle and may not be classified as a traffic accident.

A Method for Authenticating a Device

If an impact is determined to be a traffic accident and an accident vehicle terminal is specified, device authentication is required between the vehicle terminal and the vehicle information collection apparatus. In the device authentication procedure, the vehicle terminal and the vehicle information collection apparatus may previously share a public key value generated by the key generation management module of a safe key injection program. First, when the vehicle terminal sends a server access request and a device-unique number to the vehicle information collection apparatus, the vehicle information collection apparatus generates a random number and sends the generated random number back to the vehicle terminal. The vehicle terminal encrypts the device-unique number, the random number, and a server IP value using a previously received personal key and sends the encrypted value to the vehicle information collection apparatus. The vehicle information collection apparatus decodes the received encrypted value using the public key, verifies pieces of corresponding information, and may notify the vehicle terminal that the transmission of data has been permitted if, as a result of the verification, it is found to be normal.

Image Masking/Encryption and Integrity Verification/Decoding

A packet is transmitted in a public channel in an information exchange process between the vehicle terminal and the vehicle information collection apparatus. Accordingly, the packet may be exposed to a replay attack. In accordance with an embodiment of the present invention, when an encrypted image and a Message Authentication Code (MAC) tag value are transmitted to the vehicle information collection apparatus, a replay attack can be prevented by adding the time stamp value of a current point of time at which the packet is transmitted to the MAC tag value. Furthermore, inefficiency in which MAC is generated by compressing the entire image data can be improved by generating MAC using only a header value representative of the encrypted image data.

More specifically, in a process of sending accident information, the vehicle terminal performs a masking scheme for the protection of privacy for the contents of a captured image. The vehicle terminal extracts the image using an image recognition module mounted thereon and applies the masking scheme to major portions of the image through an image recognition scheme. A face and an image within the vehicle on which mosaic processing has been performed may be included in the image to which the masking scheme has been applied. Thereafter, the vehicle terminal performs a process of encrypting the data and sends the encrypted data to the vehicle information collection apparatus.

The vehicle information collection apparatus receives accident information (including the image data) from the vehicle terminal and performs an integrity verification procedure. The vehicle terminal performs symmetric key-based encryption on the corresponding image using a previously distributed encryption key in order to maintain the confidentiality of the image to which the masking scheme has been applied. After the encryption operation is terminated, the vehicle terminal selects one header value representative of the encrypted image data and generates an MAC tag value through hash operation. The vehicle terminal attaches a time stamp value indicative of a point of time at which the black box sends the packet (i.e., the encrypted image and MAC) to the vehicle information collection apparatus to the generated MAC tag value in order to prevent a replay attack and sends the MAC tag value, including the time stamp value, to the vehicle information collection apparatus along with the encrypted image. The vehicle information collection apparatus first calculates a time lag $\Delta T$ between the time stamp value of the vehicle terminal, attached to the MAC tag value, and the time stamp value of the vehicle information collection apparatus indicative of a point of time at which the vehicle terminal has received the packet and verifies whether the corresponding packet has been transmitted by the vehicle terminal by determining whether the time lag $\Delta T$ is within a permissible range. If, as a result of the verification of the time stamp values, it is found to be normal, the vehicle information collection apparatus selects a header value representative of the image data in the same manner as that in which the vehicle terminal has generated the MAC tag value for the received encrypted image and generates an MAC tag value through hash operation. The vehicle information collection apparatus compares the received MAC tag value with the generated MAC tag value. If, as a result of the comparison, the two MAC tag values are different, the vehicle information collection apparatus may be aware that the image information has been forged and falsified by an attacker. If, as a result of the comparison, the two MAC tag values are the same, the vehicle information collection apparatus may be aware that the received image of the black box corresponds to a packet that has been transmitted by a normal vehicle black box device and that has not been forged and falsified.

A Method for Storing Vehicle Information

Figure 6:
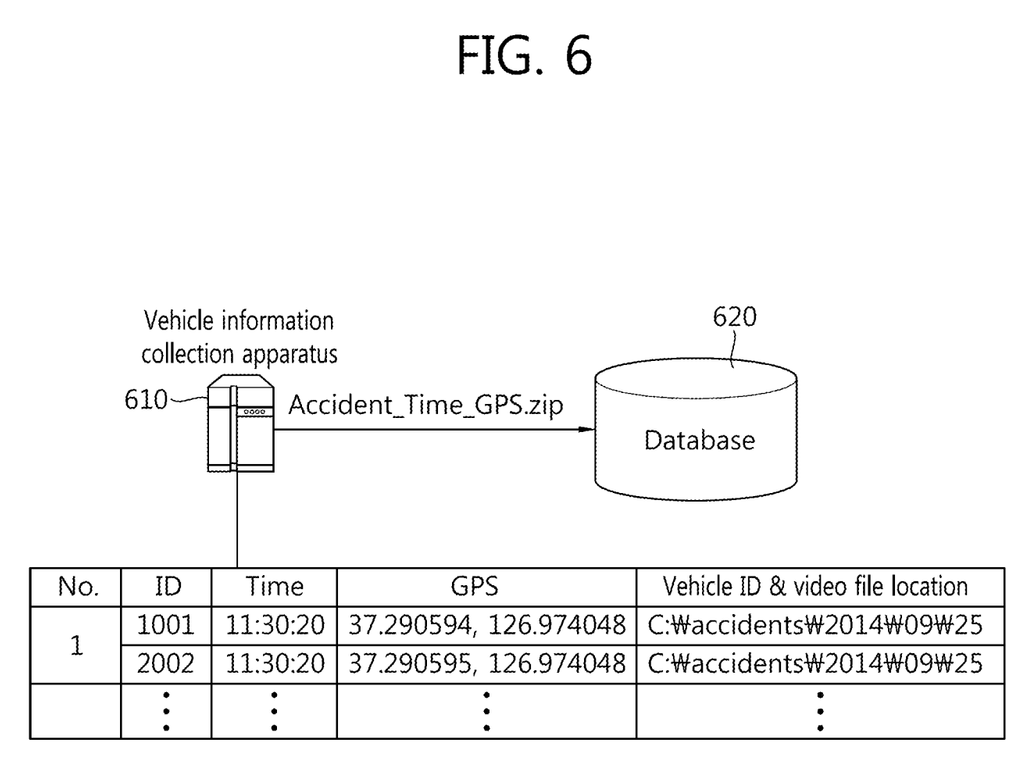
FIG. 6 is a conceptual diagram illustrating a method for storing, by a vehicle information collection apparatus, information about an accident vehicle and an image of a black box.

FIG. 6 is a conceptual diagram illustrating a method for storing, by a vehicle information collection apparatus, information about an accident vehicle and an image of a black box.

Referring to FIG. 6, the vehicle information collection apparatus 610 collects information about an accident vehicle and an image of a black box and stores them in a database 620 using time and GPS information as a file name through backup software (SW). The vehicle information collection apparatus 610 may encrypt an ID or image data on which a vehicle may be specified, may store the encrypted ID or image data in camera, and may make public only accident time and GPS information on a system. The vehicle information collection apparatus 610 may differentially encrypt the ID or image data depending on a backup SW configuration so that only an investigation agency or the person directly involved may view the ID or image data.

An Apparatus for Transmitting Vehicle Accident Information (a Vehicle Terminal or a Black Box)

Figure 7:
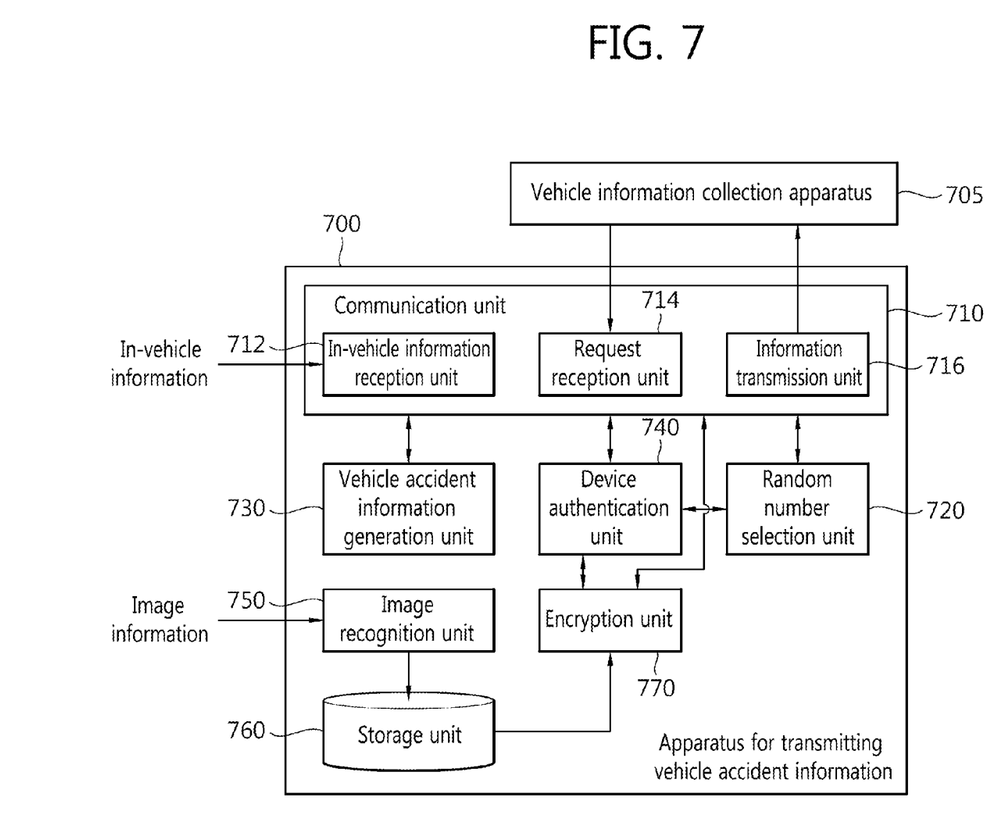
FIG. 7 is a block diagram showing an apparatus for transmitting vehicle accident information according to an embodiment of the present invention.

FIG. 7 is a block diagram showing an apparatus for transmitting vehicle accident information according to an embodiment of the present invention. As shown in FIG. 7, the apparatus for transmitting vehicle accident information 700 according to an embodiment of the present invention may include a communication unit 710, a random number selection unit 720, a vehicle accident information generation unit 730, a device authentication unit 740, an image recognition unit 750, a storage unit 760, and an encryption unit 770. Each of the elements may be implemented using a single hardware processor or at least two hardware processors.

Referring to FIG. 7, the communication unit 710 may receive information from the sensors within the vehicle through in-vehicle communication and send and receive information to and from a vehicle information collection apparatus 705 through 3G or 4G (LTE, LTE-A). The communication unit 710 may include a communication processor and an antenna. The communication unit 710 may include an in-vehicle information reception unit 712, a request reception unit 714, and an information transmission unit 716. The in-vehicle information reception unit 712 may receive an impact detection signal from the sensors of the vehicle through in-vehicle communication and send the impact detection signal to the vehicle accident information generation unit 730. The request reception unit 714 may receive various requests from the vehicle information collection apparatus 705 and send the requests to other elements. The information transmission unit 716 may send vehicle accident information, device authentication information, selected random number information, and encrypted image information to the vehicle information collection apparatus 705.

The random number selection unit 720 may select a random number corresponding to a probability value (i.e., p value) received from a base station (not shown) for random access. In this case, the random number selection unit 720 may divide a period based on impact amount information received from the in-vehicle information reception unit 712 and select a random number using a divided period having different priorities depending on the amount of impact. Furthermore, the random number selection unit 720 may select a random number in response to a device authentication request received from the vehicle information collection apparatus 705.

The vehicle accident information generation unit 730 receives impact detection information from the in-vehicle information reception unit 712 and generates vehicle accident information by including information about the time when the impact was detected and the place where the impact was detected in the impact detection information. In this case, the location information may be received from a GPS module (not shown). Furthermore, the vehicle accident information generation unit 730 may send the vehicle accident information to the information transmission unit 716.

The device authentication unit 740 may generate device authentication information in response to a device authentication request from the vehicle information collection apparatus 705. The device authentication unit 740 may have a device-unique number. For example, the device authentication unit 740 may generate the device authentication information by encrypting the random number information received from the random number selection unit 720, the device-unique number information, and a server IP value using a personal key based on a key value which is generated by a key generation management module and shared.

The image recognition unit 750 may recognize front, rear, side and/or internal images of a vehicle. The image recognition unit 750 may be a camera for the vehicle. The image recognition unit 750 may perform mosaic processing on some of the contents of an image captured through a masking scheme in order to protect privacy. The processed image data may be stored in the storage unit 760.

The encryption unit 770 may encrypt the image data. That is, the encryption unit 770 may perform symmetric key-based encryption on an image of a black box, which is stored or directly received from the image recognition unit 750. The encryption unit 770 may add the time stamp value of a current point of time at which the encrypted image data is transmitted to an MAC tag value in order to send the encrypted image data and the MAC tag value to a server, thereby being capable of preventing a replay attack. In this case, the encryption unit 770 may generate the MAC tag value by applying hash operation using only a header value representative of the encrypted image data.

A Vehicle Accident Information Collection Apparatus (Server)

Figure 8:
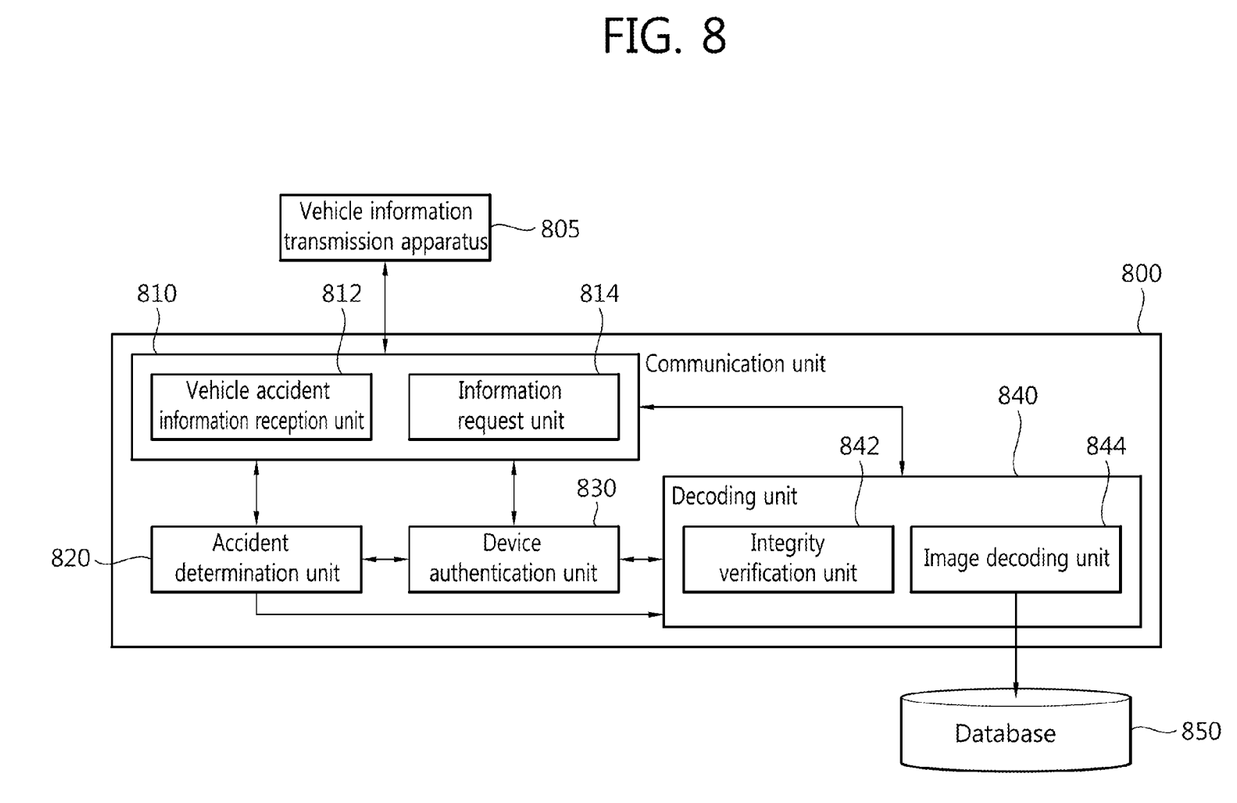
FIG. 8 is a block diagram showing a vehicle accident information collection apparatus according to an embodiment of the present invention.

FIG. 8 is a block diagram showing a vehicle accident information collection apparatus according to an embodiment of the present invention. As shown in FIG. 8, the vehicle information collection apparatus 800 according to an embodiment of the present invention may include a communication unit 810, an accident determination unit 820, a device authentication unit 830, and a decoding unit 840.

Referring to FIG. 8, the communication unit 810 may receive vehicle accident information, device authentication information, and additional accident information (may include image data) from a vehicle information transmission apparatus 805 and send various requests. The communication unit 810 may also include a communication processor and an antenna. The communication unit 810 may include a vehicle accident information reception unit 812 and an information request unit 814. The vehicle accident information reception unit 810 may receive vehicle accident information, device authentication information, and additional accident information from the vehicle information transmission apparatus 805. The information request unit 814 may send a device authentication request and an additional accident information request to the vehicle information transmission apparatus 805.

The accident determination unit 820 may generate an impact detection event list based on a plurality of pieces of vehicle accident information received from the vehicle accident information reception unit 810 and may determine a traffic accident based on the plurality of pieces of vehicle accident information including an impact detection time and location present within a threshold range. In this case, if a traffic accident is determined, the accident determination unit 820 may specify a vehicle that has sent information based on received time and location information and send information about the specified vehicle to the device authentication unit 830.

The device authentication unit 830 may request device authentication information from a specified vehicle terminal. The device authentication unit 830 may previously share a key value with the vehicle information transmission apparatus 805. When a server access request and a device-unique number are received from the vehicle information transmission apparatus 805, the device authentication unit 830 may generate a random number and send it. Furthermore, the device authentication unit 830 may decode an encrypted device-unique number, random number, and server IP value, received from the vehicle information transmission apparatus 805, using a public key and verify pieces of corresponding information. If, as a result of the verification, it is found to be normal, the device authentication unit 830 may send information indicative of the permission of data transmission to the vehicle information transmission apparatus 805.

The decoding unit 840 may include an integrity verification unit 842 and an image decoding unit 844. The integrity verification unit 842 may first receive a packet, including an encrypted image and MAC, and may calculate a time lag ΔT between the time stamp value of the vehicle information transmission apparatus 805, attached to an MAC tag value, and the time stamp value of the vehicle information collection apparatus 800, which is indicative of a point of time at which the packet was received. Furthermore, the integrity verification unit 842 may check whether the corresponding packet has been transmitted by the vehicle information transmission apparatus 805 by determining whether the time lag is within a permissible range. If, as a result of the check, it is found to be normal, the image decoding unit 844 selects a header value representative of image data in the same manner as that in which the vehicle information transmission apparatus 805 has generated the MAC tag value and generates an MAC tag value by applying hash operation. Furthermore, the image decoding unit 844 compares the MAC tag value of the vehicle information transmission apparatus 805 with the generated MAC tag value and determines whether the image data has been forged and falsified. If, as a result of the determination, the image data is found to have not been forged and falsified, the image decoding unit 844 may decode the encrypted image data and store the decoded image data in a database 850. When storing the decoded image data in the database 850, the image decoding unit 844 may use impact detection time and location information, included in vehicle accident information, as a file name. Furthermore, the image decoding unit 844 may specify a vehicle, may specify a video file storage location, and may store information about the specified vehicle and video file storage location in the database 850.

In accordance with the method and apparatus for transmitting vehicle accident information and the vehicle information collection apparatus and method according to the embodiments of the present invention, traffic accident information can be collected in real time, and accident information and personal information can be safely protected and used because the intervention of a person is not required in a collection process.

The present invention has been described above with reference to the accompanying drawings and some embodiments, but the scope of the present invention should not be construed as being limited to the drawings or the embodiments. It is to be understood that those skilled in the art may modify and change the present invention in various ways without departing from the spirit and scope of the present invention written in the claims.

What is claimed is:

1. A method for collecting, by a vehicle accident information collection apparatus, vehicle accident information, the method comprising:
   receiving vehicle accident information comprising impact detection time information and impact detection location information from vehicle communication terminals;
   determining whether a vehicle accident has occurred in response to the impact detection time information received from the vehicle communication terminals being similar to each other within a time threshold and the impact detection location information received from the vehicle communication terminals being similar to each other within a location threshold;
   requesting a vehicle communication terminal of the vehicle communication terminals to send accident information to the vehicle accident information collection apparatus, in response to determining that the vehicle accident occurred;
   receiving encrypted image data related to the vehicle accident from the vehicle communication terminal in response to the request; and
   decoding the received image data and storing the decoded image data along with the vehicle accident information.

2. The method of claim 1, wherein the determining of whether the vehicle accident has occurred based on the received vehicle accident information comprises:
   determining that the vehicle accident occurred, in response to determining that at least more than one pair of the impact detection time information and the impact detection location information are included within the time threshold and the location threshold, respectively.

3. The method of claim 1, further comprising:
   specifying a terminal which has sent information as the vehicle communication terminal based on information on a reception time of the vehicle accident information and a location information of the vehicle accident information in response to determining that the vehicle accident has occurred;
   sending a device authentication request to the specified vehicle communication terminal related to the vehicle accident;
   receiving authentication information transmitted by the vehicle communication terminal in response to the device authentication request; and
   authenticating the vehicle communication terminal by decoding the received authentication information.

4. The method of claim 3, further comprising:
   generating and transmitting a random number to the vehicle communication terminal, in response to receiving a server access request and a device-unique number from the vehicle communication terminal,
   wherein a public key value is previously shared with the vehicle communication terminal for device authentication.

5. The method of claim 4, further comprising:
   upon receiving information obtained by encrypting the device-unique number, the random number, and a server IP value transmitted by the vehicle communication terminal, using a personal key value,
   decoding the received information using the public key value, verifying the decoded information, and
   notifying a permission of transmission of image data to the vehicle communication terminal.

6. The method of claim 1, further comprising:
   searching whether a surrounding terminal is within a specific distance from the vehicle communication terminal at vehicle accident location and time in response to determining that the vehicle accident has occurred; and
   requesting image data related to the vehicle accident to the surrounding terminal in response to finding the surrounding terminal.

7. The method of claim 1, further comprising:
   receiving integrity verification information along with the encrypted image data related to the vehicle accident received in response to the request, and
   decoding the encrypted image data using the received integrity verification information.

8. The method of claim 7, wherein the integrity verification information comprises:
   a message authentication code (MAC) tag value generated through hash operation based on a header representative of the image data, and
   a time stamp value of a point of time at which the image data is transmitted.

9. The method of claim 8, wherein:
   by calculating a time lag between a time stamp value attached to the MAC tag value and a time stamp value of a point of time at which the image data is received, integrity of the image data is verified by determining whether the time lag is within a permissible range.

10. A vehicle accident information collection apparatus, comprising:
    a vehicle accident information reception unit configured to receive vehicle accident information comprising impact detection time information and impact detection location information from vehicle communication terminals;
    an accident determination unit configured to determine whether a vehicle accident has occurred in response to the impact detection time information received from the vehicle communication terminals being similar to each other within a time threshold and the impact detection location information received from the vehicle communication terminals being similar to each other within a location threshold;
    an information request unit configured to request a vehicle communication terminal of the vehicle communication terminals to send accident information to the accident determination unit, in response to determining that the vehicle accident occurred;

a decoding unit configured to decode encrypted image data related to the vehicle accident, which is received in response to the request; and a storage unit configured to store the decoded image data along with the vehicle accident information.

11. A method for sending, by a vehicle communication terminal, vehicle accident information to a vehicle information collection apparatus, the method comprising:

receiving an impact detection signal of a specific strength or more from a sensor within a vehicle;

generating vehicle accident information based on impact detection time information and impact detection location information included in the received impact detection signal;

sending the generated vehicle accident information to the vehicle information collection apparatus;

receiving an accident information transmission request based on a result of a determination of whether a vehicle accident has occurred in response to the impact detection time information received from vehicle communication terminals being similar to each other within a time threshold and the impact detection location information received from the vehicle communication terminals by the vehicle information collection apparatus being similar to each other within a location threshold;

encrypting image data related to the vehicle accident in response to the request; and sending the encrypted image data to the vehicle information collection apparatus.

12. The method of claim 11, further comprising:

receiving access barring information from a base station;

selecting a specific random number in response to the access barring information; and sending the selected specific random number to the base station, wherein the base station compares the selected specific random number with a probability value of the access barring information and permits random access when the selected specific random number is lower than the probability value.

13. The method of claim 12, wherein the specific random number is selected in one of periods divided based on an amount of impact.

14. The method of claim 13, wherein the periods divided based on the amount of impact have different access priorities.

15. The method of claim 11, further comprising receiving a device authentication request from the vehicle information collection apparatus in response to determining that the vehicle accident has occurred on a result of the determination of the vehicle information collection apparatus.

16. The method of claim 15, further comprising:

sending a server access request and a device-unique number in response to the device authentication request, encrypting the device-unique number, a random number, and a server IP value using a personal key in response to receiving the random number from the vehicle information collection apparatus, and sending the encrypted device-unique number, random number, and server IP value to the vehicle information collection apparatus.

17. The method of claim 11, further comprising:

encrypting the image data related to the vehicle accident using a masking scheme in response to the accident information transmission request, and sending the encrypted image data to the vehicle information collection apparatus.

18. The method of claim 17, further comprising sending integrity verification information along with the encrypted image data, wherein the integrity verification information comprises a message authentication code (MAC) tag value generated through hash operation based on a header representative of the image data and a time stamp value of a point of time at which the image data is transmitted.

19. An apparatus for transmitting vehicle accident information to a vehicle information collection apparatus, the apparatus comprising:

an intra-vehicle signal reception unit configured to receive an impact detection signal of a specific strength or more from a sensor within a vehicle;

a vehicle accident information generation unit configured to generate the vehicle accident information based on impact detection time information and impact detection location information included in the received impact detection signal;

a request reception unit configured to receive an accident information transmission request based on a result of a determination of whether a vehicle accident has occurred in response to the impact detection time information received from vehicle communication terminals being similar to each other within a time threshold and the impact detection location information received from the vehicle communication terminals being similar to each other within a location threshold by the vehicle information collection apparatus;

an encryption unit configured to encrypt image data related to the vehicle accident in response to the request; and an information transmission unit configured to send the generated vehicle accident information and the encrypted image data to the vehicle information collection apparatus.

20. A method for collecting, by a vehicle accident information collection apparatus, vehicle accident information, the method comprising:

receiving, from a first vehicle communication terminal, first impact detection time information and first impact detection location;

receiving, from a second vehicle communication terminal, second impact detection time information and second impact detection location information;

determining that a vehicle accident has occurred, in response to the first and second impact detection time information being similar within a specified time range, and the first and second impact detection location information being similar within a specified location range;

requesting one of the first and second vehicle communication terminals to send accident information to the vehicle accident information collection apparatus, in response to determining that the vehicle accident has occurred;

receiving image data related to the vehicle accident from the vehicle communication terminal, in response to the requesting; and storing the image data along with the vehicle accident information.

* * * * *